United States Patent
Ali et al.

(10) Patent No.: US 9,450,774 B2
(45) Date of Patent: Sep. 20, 2016

(54) FAST PROTECTION SWITCHOVER IN A TRANSPORT NETWORK

(71) Applicant: Cisco Technology, Inc., San Jose, CA (US)

(72) Inventors: Zafar Ali, Hicksville, NY (US); Antonello Bonfanti, Carnate (IT)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 14/270,437

(22) Filed: May 6, 2014

(65) Prior Publication Data

US 2015/0326427 A1   Nov. 12, 2015

(51) Int. Cl.
*H04L 12/24* (2006.01)
*H04L 12/723* (2013.01)
*H04L 12/64* (2006.01)

(52) U.S. Cl.
CPC ........... *H04L 12/24* (2013.01); *H04L 12/64* (2013.01); *H04L 12/6418* (2013.01); *H04L 41/0668* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 2002/0075873 A1* | 6/2002 | Lindhorst-Ko | ......... | H04L 45/00 370/394 |
| 2003/0043792 A1* | 3/2003 | Carpini | ................ | H04L 45/00 370/386 |
| 2004/0109683 A1* | 6/2004 | Mistry | ............. | H04J 14/0284 398/5 |
| 2007/0036073 A1* | 2/2007 | Yamada | ................ | H04L 45/10 370/225 |
| 2007/0159961 A1* | 7/2007 | Zhai | .................... | H04L 45/00 370/217 |
| 2011/0141880 A1* | 6/2011 | Suwala | ............... | H04L 12/4633 370/217 |
| 2012/0163224 A1* | 6/2012 | Long | .................. | H04L 41/5025 370/252 |
| 2012/0250500 A1* | 10/2012 | Liu | ........................ | H04L 45/22 370/228 |
| 2013/0064073 A1* | 3/2013 | Cheng | ................... | H04L 45/24 370/225 |
| 2013/0071117 A1* | 3/2013 | Pan | ........................ | H04J 3/12 398/45 |
| 2014/0146663 A1* | 5/2014 | Rao | ........................ | H04L 45/28 370/228 |
| 2014/0185429 A1* | 7/2014 | Takase | ................... | H04L 45/28 370/225 |

OTHER PUBLICATIONS

Anjali, et al., "LSP and λSP Setup in GMPLS Networks," IEEE INFOCOM 2004, Mar. 2014, 11 pages.
Gandhi, et al., "RSVP-TE Extensions for Signaling GMPLS Restoration LSP," Internet Engineering Task Force (IETF), CCAMP Working Group, Internet-Draft, Standards Track, Oct. 15, 2012, pp. 1-9.
Gandhi, et al., "RSVP-TE Signaling for GMPLS Restoration LSP," Internet Engineering Task Force (IETF), CCAMP Working Group, Internet-Draft, Informational, Mar. 6, 2014, pp. 1-7.

* cited by examiner

*Primary Examiner* — Andrew Lai
*Assistant Examiner* — Jamaal Henson
(74) *Attorney, Agent, or Firm* — Edell, Shapiro & Finnan, LLC

(57) ABSTRACT

Presented herein are techniques that enable fast switchover or reversion between label switched paths. In accordance with examples presented herein, a working label switched path is added to a fast switchover protection group that is configured to carry traffic from an ingress network device to an egress network device through a transport network. A restoration label switched path associated with the working label switched path is also added to the fast switchover protection group. The fast switchover protection group is stored at the ingress network device. After storing the fast switchover protection group at the ingress network device, at least the working label switched path is used to carry traffic through the transport network.

20 Claims, 6 Drawing Sheets

FAST PROTECTION SWITCHOVER IN A TRANSPORT NETWORK

TECHNICAL FIELD

The present disclosure relates to transport networks.

BACKGROUND

Telecommunication networks may generally include two components, namely a "transport network" and an "access network." Transport networks, sometimes referred to as backbone, core, and/or long-haul networks, may be wide access networks that span large regional and/or global distances. Access networks, sometimes referred to as distribution networks, connect the transport networks to the user premises. Both transport networks and access networks may be formed using various wired (e.g., copper, coax, optical fiber, etc.) and wireless (e.g., mobile, satellite, and microwave) technologies.

There are a number of different types of transport networks. In some instances, a transport network may be an optical transport network (OTN). An OTN is a set of Optical Network Elements (ONE) connected by optical fiber links. In other examples, a transport network may be a packet transport network (PTN). A PTN is a connection-oriented transport network based on Internet Protocol (IP) technology.

DESCRIPTION OF EXAMPLE EMBODIMENTS

Overview

Figure 1:
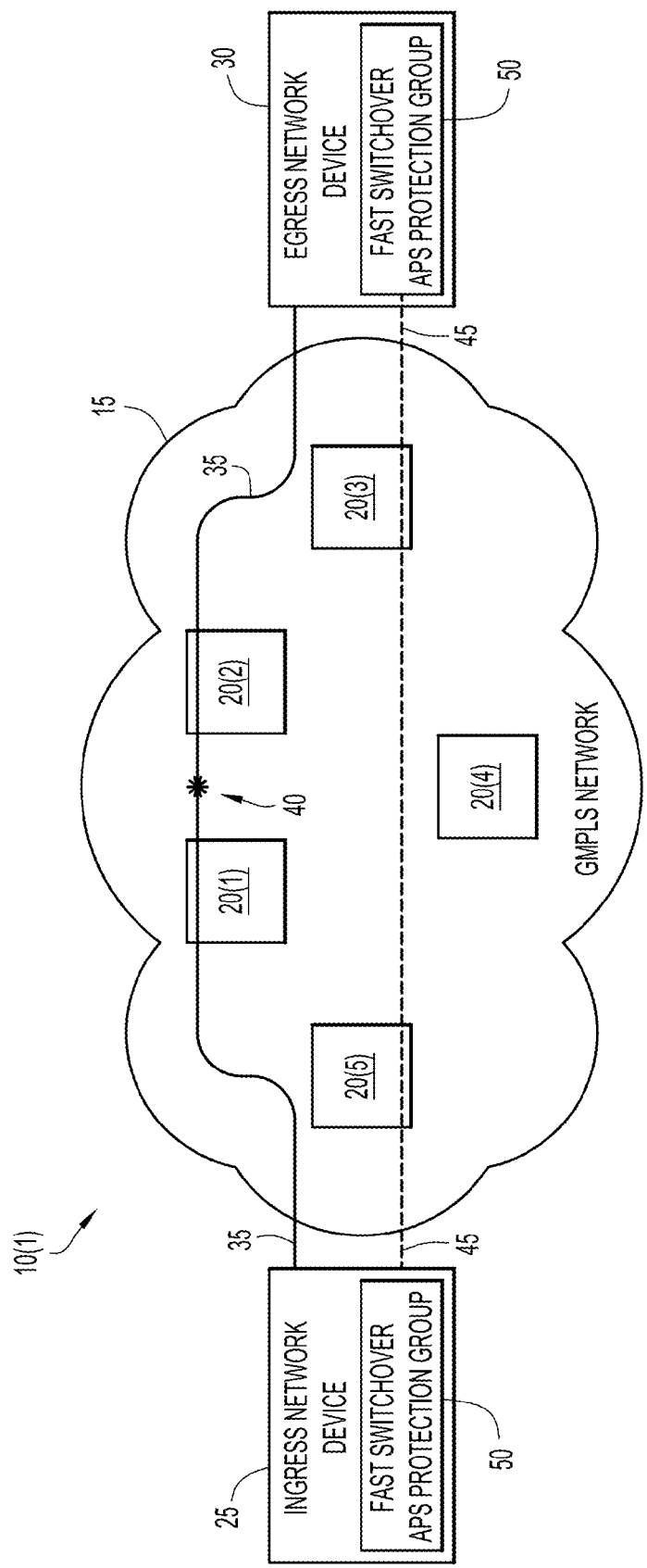
FIGS. 1 and 2 are block diagrams of a transport network configured to execute fast protection switchover techniques in accordance with an example embodiment.

Presented herein are techniques that enable fast switchover or reversion between label switched paths. In accordance with an example embodiment, a working label switched path is added to a fast switchover protection group that is configured to carry traffic from an ingress network device to an egress network device through a transport network. A restoration label switched path associated with the working label switched path is also added to the fast switchover protection group. The fast switchover protection group is stored at the ingress network device and, after storing the fast switchover protection group at the ingress network device, at least the working label switched path is used to carry traffic through the transport network.

Example Embodiments

Multiprotocol Label Switching (MPLS) is a mechanism in high-performance telecommunications networks that is used to direct data from one network node to the next based on short path labels, rather than long network addresses. The use of MPLS avoids complex lookups in routing tables. In MPLS, traffic flows (traffic) are connection-oriented and the traffic is routed along pre-configured label switched paths (LSPs). A modification to MPLS, referred to as Generalized MPLS (GMPLS), extends the MPLS concept of a label to include values defined by the medium that is being provisioned.

In transport networks (e.g., optical transport networks (OTNs), packet transport networks (PTNs), etc.), a label switched path may be a "working label switched path," a "protecting label switched path," or a "restoration label switched path." A working label switched path is a primary path (connection) used to carry (transport) traffic through the network (i.e., a current operational path). A protecting label switched path is a backup path through the network that is associated with the working label switched path. A restoration label switched path is a path that is used when a working or protecting label switched path experiences a failure. That is, when a particular working or protecting label switched path is no longer available to carry traffic, a restoration label switched path may be used to carry the traffic previously carried by the particular working or protecting label switched path.

Transport networks may use different combinations of working label switched paths, protecting label switched paths, and restoration label switched paths. For example, a transport network may use a "1+R" scheme where a service (working label switched path) is unprotected (i.e., no protecting label switched path is present) but a restoration label switched path can be created after the working label switched path experiences a failure. A transport network may also use a "1:1+R" scheme where a service is 1:1 protected (i.e., a working label switched path has a protecting label switched path that does not carry traffic) and a restoration label switched path can be created after a failure. A transport network may further use a "1+1+R" scheme were a service is 1+1 protected when both the working and protecting label switched paths carry traffic and, if either the working or protecting label switched path fails, a restoration label switched path may be created for the path that failed.

In conventional arrangements, a restoration path is not signaled until after a failure is detected at the working or protecting label switched path. More specifically, in such conventional techniques, before a restoration label switched path can start to carry traffic, an ingress network device (e.g., a network device that transmits (or forwards) traffic on the working label switched path) must signal to an egress network device (e.g., a network device that receives traffic on the working label switched path) that the restoration label switched path is active. In other words, bi-directional end-to-end signaling is required between the ingress network device and the egress network device before switchover to the restoration label switched path occurs (i.e., before the restoration label switched path is used to carry traffic). This end-to-end "activation" signaling can take, for example, 200 milliseconds (ms), 500 ms, or even a second during which traffic is lost by the transport network. Since this end-to-end signaling occurs subsequent to (i.e., after) a failure, there is an inherent delay in switchover of traffic to the restoration label switched path. Similarly, when traffic needs to be reverted back from restoration label switched path to the working path, the same delay results (i.e., up to a second of traffic loss).

Presented herein are fast protection switchover techniques that eliminate the requirement for end-to-end "activation"

signaling before traffic can be carried on a restoration label switched path. As such, the techniques presented herein enable switchover or reversion to be performed hitless (i.e., with substantially no traffic loss) or within approximately 50 ms in the 1+R, 1+1+R or 1:1+R schemes. The techniques presented herein also enable the use of software-based bridge-and-roll (i.e., bridge-and-roll without buffering) to perform path switchover.

The fast protection switchover techniques presented herein may be implemented in a number of different transport networks (i.e., packet transport networks (PTNs), optical transport networks (OTNs), etc.). Merely for ease of illustration, examples are primarily described with reference to OTNs that use GMPLS. It will be appreciated that these examples are non-limiting and other networks and/or protocols may be used in alternative examples.

FIG. 1 is block diagram of a transport network 10(1) configured to perform fast protection switchover techniques in accordance with examples presented herein. As shown, a GMPLS OTN 15 is present and comprises a plurality of network devices (network nodes) in the form of optical cross-connect devices or optical cross-connects (OXC) 20(1)-20(5). Optical cross-connects are devices used to switch high-speed optical signals in a fiber optic network, such as an optical mesh network. As such, the optical cross-connects 20(1)-20(5) are interconnected by optical fibers. For ease of illustration, the optical fibers interconnecting the optical cross-connects 20(1)-20(5) have been omitted from FIG. 1.

Transport infrastructures can be viewed as a complex mesh of variously interconnected optical or traditional subnetworks, where each subnetwork consists of several routing and switching devices operating according to the same control plane protocols and policies. With these very different types of devices, all the forwarding decisions are based on a combination of packet or cell, timeslot, wavelengths, or physical ports, depending on the position (edge or core) and role (intermediate or termination or gateway node) of the network devices in the network layout. Reference to a "transport network" herein may include any portion of a transport infrastructure. As such, the transport network 10(1) of FIG. 1 may be viewed as a portion of a transport infrastructure using OTN technology to carry traffic.

Connected to, or part of, the GMPLS network 15 of FIG. 1 are edge devices 25 and 30, referred to as ingress network device 25 and egress network device 30, respectively. The ingress network device 25 is a device through which traffic enters the GMPLS network 15, while egress network 30 is a device through which traffic exits the GMPLS network 15. The ingress network device 25 and the egress network device 30 may be, for example, optical cross-connects, electro-optical routers (e.g., MPLS/IP electro-optical routers), or other network devices. Merely for ease of illustration, the ingress network device 25 and the egress network device 30 will be described as ingress and egress optical cross-connects, respectively.

FIG. 1 illustrates a 1+R recovery scheme that includes a working label switched path 35 from ingress network device (ingress optical cross-connect) 25 through optical cross-connects 20(1), 20(2), and 20(3) to egress network device (egress optical cross-connect) 30. Initially, the working label switched path 35 is used to carry traffic from the ingress network device 25 to the egress network device 30. However, at some point in time a failure 40 occurs somewhere along the working label switched path 35 such that the path can no longer be used to carry traffic from the ingress network device 25 to the egress network device 30.

As noted above, in conventional arrangements a restoration label switched path is signaled after the detection of a failure at a working or protecting label switched path (i.e., end-to end signaling between the ingress network device and the egress device is required before the restoration label switched path can carry traffic). Therefore, in conventional arrangements, only after completion of the end-to-end signaling can switchover to the newly signaled restoration label switched path occur.

In contrast to these conventional arrangements, in the example of FIG. 1 switchover from the failed working label switched path 35 to a restoration label switched path 45 occurs substantially immediately without the need to perform end-to-end signaling between the ingress network device 25 and the egress network device 30 (i.e., without signaling to activate the restoration label switched path 45 through cross-connects 20(5) and 20(3)). As a result, switchover from the working label switched path 35 to the restoration label switched path 45 occurs substantially immediately with little or no traffic loss. In certain examples, the switchover from working label switched path 35 to a restoration label switched path 45 is hitless (i.e., no traffic loss) or completed within approximately 50 ms (i.e., approximately 50 ms of traffic loss).

The techniques presented herein enable the fast switchover from working label switched path 35 to a restoration label switched path 45 due to the presence of fast switchover protection group 50 at both ingress network device 25 and egress network device 30. The fast switchover protection group 50 may be a modified implementation of, for example, an Automatic Protection Switching (APS) protection group, a Protection State Coordination (PSC) protection group, a Secure Network Communication (SNC) protection group, a Synchronous Optical Networking (SONET) protection group, a Synchronous Digital Hierarchy (SDH) protection group, Unidirectional path-switched ring (UPSR) protection group, etc. Merely for ease of illustration, the examples presented herein will be described with reference to fast switchover APS protection groups.

In the example of FIG. 1, the fast switchover APS protection group 50 is an extension that enables an APS implementation to handle more than two sources of traffic. More specifically, an APS state machine is modified such that it can take more than two sources of traffic and can select from N sources (instead of only two (2) sources permitted in conventional arrangements). When the restoration label switched path 40 for working label switched path 35 is initially established, it is programmed as part of APS state machine. That is, the APS state machine is defined to include the restoration label switched path 40 before traffic is transmitted on the working label switched path 35. Therefore, because the restoration label switched path 40 is already part of the APS state machine, there is no need to perform end-to-end signaling before the restoration label switched path 40 can be used. As such, upon detection of a failure at working label switched path 35, the ingress network device 25 can substantially immediately start using restoration label switched path 40 to carry traffic to egress network device 30. Again, because the restoration label switched path 40 is part of the fast switchover APS protection group 50 defined at both ingress network device 25 and egress network device 30, the egress network device 30 recognizes the traffic carried on restoration label switched path 40. In this way, the switchover from working label switched path 35 to restoration label switched path 40 is hitless or only experiences around 50 ms traffic loss.

Figure 2:
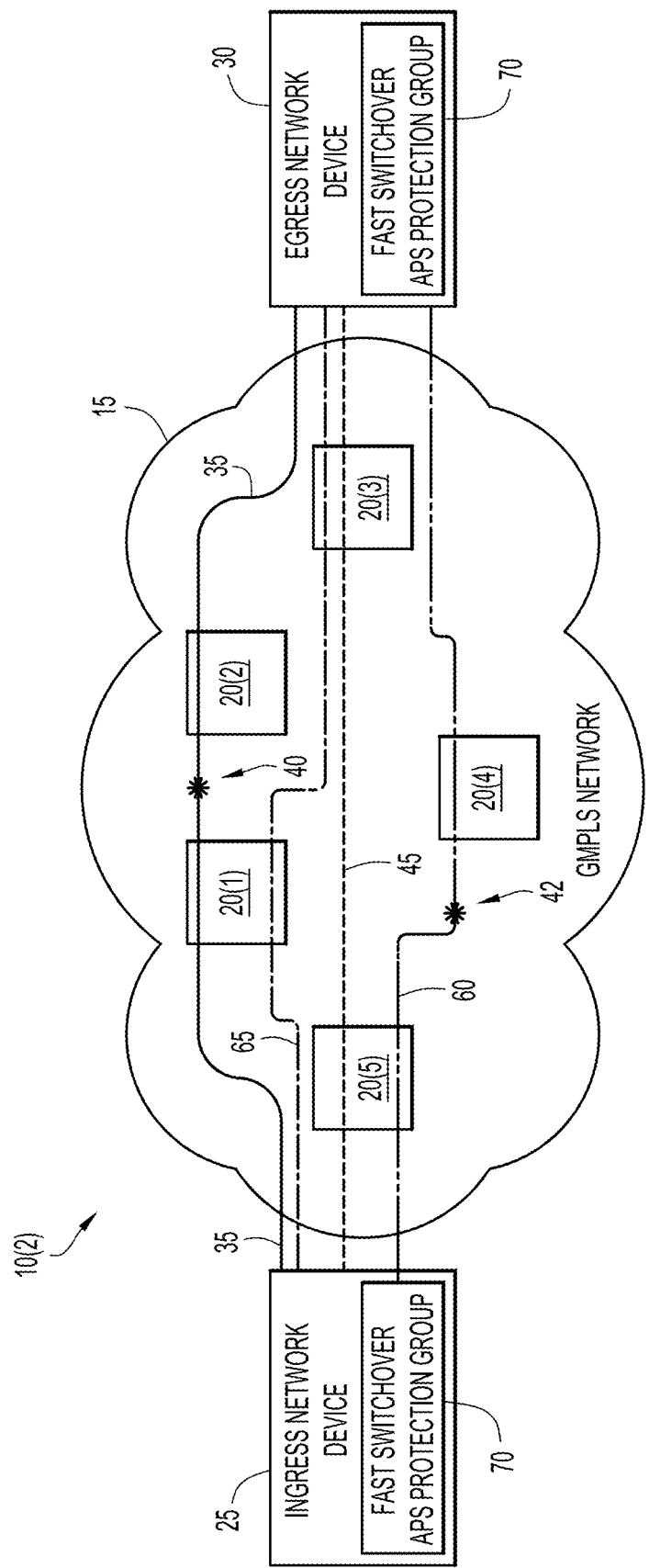

FIG. 2 is block diagram of another transport network 10(2) configured to perform fast protection switchover techniques in accordance with other examples presented herein. For ease of illustration, the transport network 10(2) of FIG. 2 is described with reference to the GMPLS network 15 and edge devices (i.e., ingress network device 25 and egress network device 30) of FIG. 1.

FIG. 2 illustrates a 1:1+R or, alternatively a 1+1+R, recovery scheme that first includes a working label switched path 35 through optical cross-connects 20(1), 20(2), and 20(3). A protecting label switched path 60 through optical cross-connects 20(5) and 20(4) is also provided. Protecting label switched path 60 is associated with working label switched path 35 and may carry traffic (in a "1+1+R" scheme) or may not carry traffic (in a "1:1+R" scheme).

Initially, the label switched path 35 (and optionally the protecting label switched path 60) is used to carry traffic from the ingress network device 25 to the egress network device 30. However, in one example, at some point in time a failure 40 occurs somewhere along the working label switched path 35 such that the path can no longer be used to carry traffic from the ingress network device 25 to the egress network device 30.

As noted above, in conventional arrangements a restoration label switched path is signaled after the detection of a failure at a working label switched path (i.e., end-to end signaling between the ingress network device and the egress device). Therefore, in conventional arrangements, only after completion of this end-to-end signaling can switchover to the newly signal restoration label switched path. In contrast to these conventional arrangements, in the example of FIG. 2 switchover from the failed working label switched path 35 to a restoration label switched path 45 occurs substantially immediately without the need to perform end-to-end signaling between the ingress network device 25 and the egress network device 30 to activate the restoration label switched path 45 through cross-connects 20(5) and 20(3). That is, switchover from the working label switched path 35 to the restoration label switched path 45 occurs substantially immediately with little or no traffic loss. In certain examples, the switchover from working label switched path 35 to a restoration label switched path 45 is hitless (i.e., no traffic loss) or within approximately 50 ms (i.e., 50 ms of traffic loss).

In an alternative example also shown at FIG. 2, a failure 42 may occur in the protecting label switched path 60, rather than in the working label switched path 35. In such an example, switchover from the failed protecting label switched path 60 to a restoration label switched path 65 occurs substantially immediately without the need to perform end-to-end signaling between the ingress network device 25 and the egress network device 30 to activate the restoration label switched path 65 through cross-connects 20(1) and 20(3). That is, switchover from the protecting label switched path 60 to the restoration label switched path 65 occurs substantially immediately with little or no traffic loss. In certain examples, the switchover from protecting label switched path 60 to the restoration label switched path 65 is hitless (i.e., no traffic loss) or within approximately 50 ms (i.e., 50 ms of traffic loss).

The techniques illustrated in FIG. 2 enable the fast switchover from a working label switched path 35 and/or a protecting label switched path 60 to a restoration label switched path 45 or 65, respectively, due to the presence of fast switchover protection group 70 at both ingress network device 25 and egress network device 30. Similar to the examples of FIG. 1, the fast switchover protection group 70 may be a modified implementation of, for example, an APS protection group, a PSC protection group, a SNC protection group, a SONET protection group, a SDH protection group, a UPSR protection group, etc. Merely for ease of illustration, the examples of FIG. 2 are described with reference to a fast switchover APS protection group 70.

In the example of FIG. 2, the fast switchover APS protection group 70 is an extension that enables an APS implementation to handle more than two sources of traffic. More specifically, an APS state machine is modified such that it can take more than two sources of the traffic and can select from N sources (instead of only two (2) sources permitted in conventional arrangements). When the restoration label switched path 45 for working label switched path 35 and the restoration label switched path 65 for protecting label switched path 60 are initially established, both of restoration paths are programmed as part of the APS state machine. Therefore, because the restoration label switched paths 45 and 65 are already part of the APS state machine, there is no need to perform end-to-end signaling before the restoration label switched paths can be used. As such, upon detection of a failure, the ingress network device 25 can substantially immediately start using the appropriate restoration label switched path 45 or 65 to carry traffic to egress network device 30. Again, because the restoration label switched paths 45 and 65 are part of the fast switchover APS protection group 70 stored at both ingress network device 25 and egress network device 30, the egress network device 30 recognizes the traffic carried on the appropriate restoration label switched path. In this way, the switchover from working label switched path 35 to restoration label switched path 45 or from protecting label switched path 60 to restoration label switched path 65 is hitless or only experiences around 50 ms traffic loss.

In the examples of FIGS. 1 and 2, the working label switched path 35 may be signaled over a nominal path (i.e., minimum latency, minimum cost, etc.). It is to be appreciated there are scenarios where service providers would like to keep resources associated with the working label switched path 35 or a protecting switched path 60 (FIG. 2) reserved. This may be to, for example, ensure that the service (working label switched path) can use the nominal path when the failure is repaired. Consequently, in transport networks, when a new restoration label switched path is used, the while working label switched path and/or protecting label switched path are not torn down in the control plane as a result of a failure. This means that, in accordance with examples presented herein, the APS state machine is modified to take up to four traffic sources. These traffic sources (components) are the (1) the working label switched path, the (2) protecting label switched path, (3) the restoration label switched path for the working label switched path, and (4) the restoration label switched path for the protecting label switched path.

Figure 3:
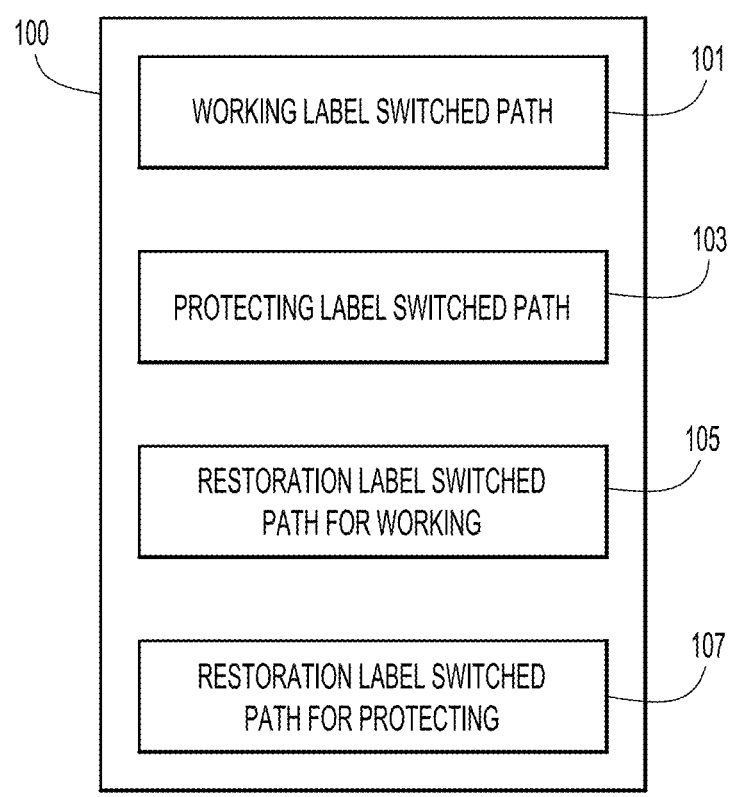
FIG. 3 is a schematic diagram illustrating a fast switchover protection group in accordance with an example embodiment.

FIG. 3 is a schematic representation of an APS protection group data structure 100 corresponding to an APS state machine modified to accept traffic from four sources. A shown, the data structure 100 included data representing a working label switched path 101, data representing a protecting label switched path 103, data representing a restoration label switched path 105 associated with the working label switched path, and data representing a restoration label switched path 105 associated with the protecting label switched path.

In accordance with examples presented herein, at ingress network device 25 and egress network device 30, the working label switched path 25, protecting label switched path 60, restoration label switched path 40, and restoration label switched path 65 are programmed as APS pairs such that a second failure is restored within approximately 50 ms for 1:1+R or hitless for 1+1+R. Additionally, reversion from the restoration label switched path 40, and restoration label switched path 65 to the working label switched path 35 or the protecting label switched path 60, respectively, can be performed within approximately 50 ms for 1:1+R or hitless for 1+1+R.

Figure 4:
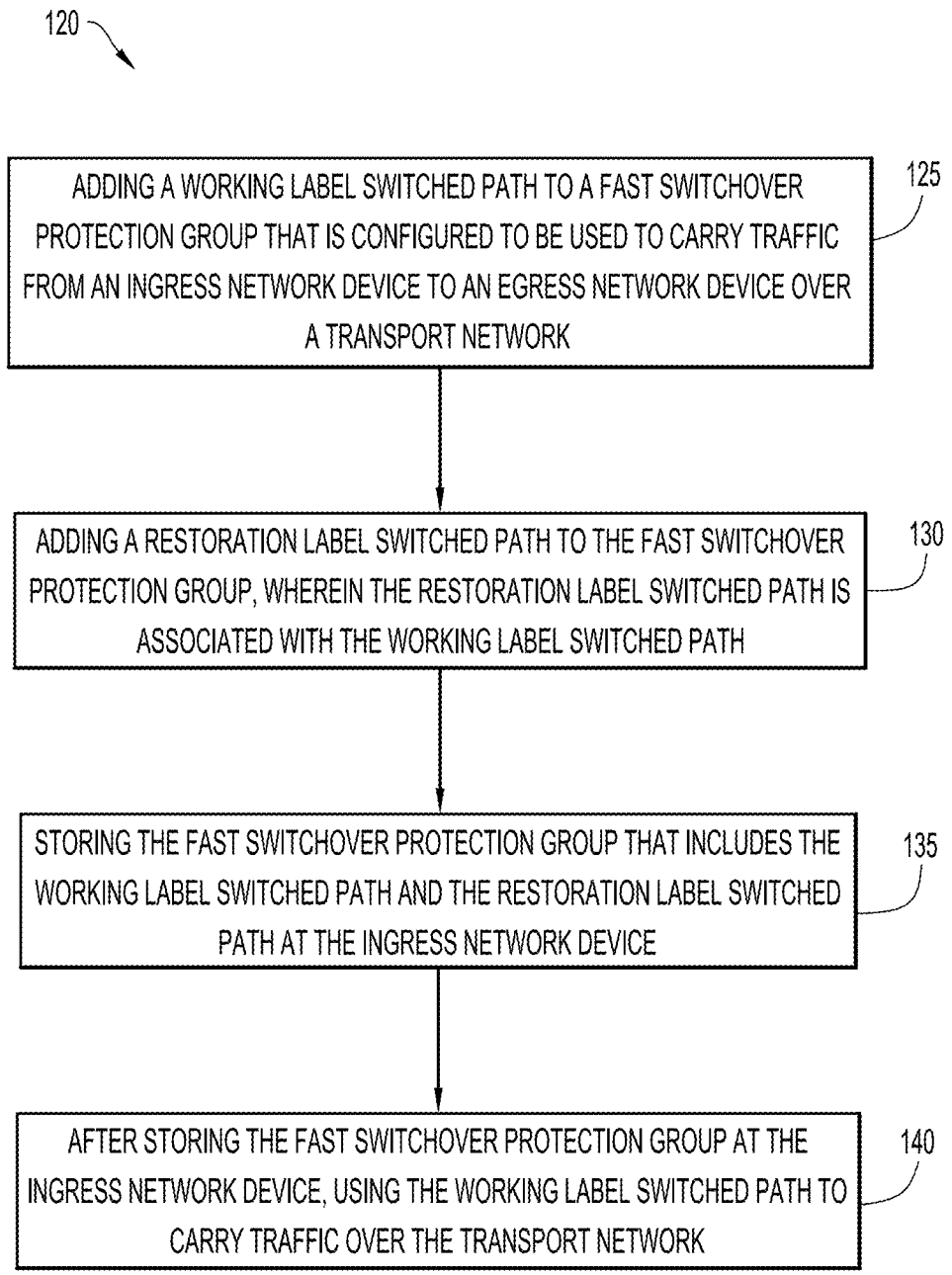
FIG. 4 is a flowchart illustrating one method in accordance with an example embodiment.

FIG. 4 is a flowchart of a method 120 in accordance with examples presented herein. The method 120 begins at 125 where a working label switched path is added to a fast switchover protection group that is configured to be used to carry traffic from an ingress network device to an egress network device through a transport network. At 130, a restoration label switched path is added to the fast switchover protection group. The restoration label switched path is associated with the working label switched path. At 135, the fast switchover protection group that includes the working label switched path and the restoration label switched path is stored at the ingress network device. At 140, after the fast switchover protection group is stored at the ingress network device, the working label switched path is used to carry traffic through the transport network. In other words, the restoration label switched path is added to the fast switchover protection group before the working label switched path is used to carry traffic through the transport network.

In certain examples, after the restoration label switched path is added to the fast switchover protection group, the fast switchover protection group is stored at an egress network device of the transport network. The fast switchover protection group may be stored at the egress network device before the working label switched path is used to carry traffic through the transport network.

In further examples, a protecting label switched path is added to the fast switchover protection group. The protecting label switched path is associated with the working label switched path (i.e., the protecting label switched path is a backup path for the working label switched path). An additional restoration label switched path may also be added to the fast switchover protection group. The additional restoration label switched path may be associated with the protecting label switched path.

Hardware-based bridge-and-roll is useful to, for example, do maintenance on a network, enlarge capacity, etc. For example, a new (higher capacity) connection may be established and hardware-based bridge-and-roll is used to switchover from an original connection to the new connection (i.e., the resources of the original connection are given to the new connection). Hardware-based bridge-and-roll requires that there are some hardware packet buffers present (on either end) that are able to store traffic during the switchover. That is, the hardware buffers are used to buffer (store) traffic during the switchover downtime (i.e., the time when no connection is active and traffic cannot be transmitted). Without the use of hardware buffers, significant amounts of traffic would be lost in these conventional arrangements. As such, the use of bridge-and-roll is not available in conventional arrangements unless sufficient hardware buffering capacity is available. Due to the need for hardware buffers, bridge-and-roll is not used for path protection (i.e., not used with protection groups), but rather only used for network maintenance operations.

In accordance with examples presented herein, a mechanism for performing bridge-and-roll operations in software, rather than in hardware, is provided. That is, bridge-and-roll is available even in cases where hardware buffers are not available. This is possible because, as detailed above, there is no need to signal the restoration label switched path before it is used to carry traffic. As such, the switchover is hitless or occurs within 50 msec. Thus, the requirement for hardware buffers is eliminated (i.e., the switchover can occur quickly and the buffering of traffic is no longer required).

In the examples presented herein, the software-based bridge-and-roll functionality is used herein to move signals/traffic from one label switched path to another label switched path. That is, bridge-and-roll refers to the operations performed to accomplish switchover from, for example, a working label switched path to a restoration label switched path. The bridge-and-roll operations are a set of operations coordinated between two neighboring nodes and orchestrated either by a common management system or manually. These operations collectively take the traffic from the first label switched path (i.e., the path from which traffic is being rolled), and establishing cross connects to the second label switched path (i.e., the path to which traffic is being rolled). Software-based bridge-and-roll may be used to make reversion (e.g., take traffic from the second label switched path back to the first label switched path) hitless.

Figure 5:
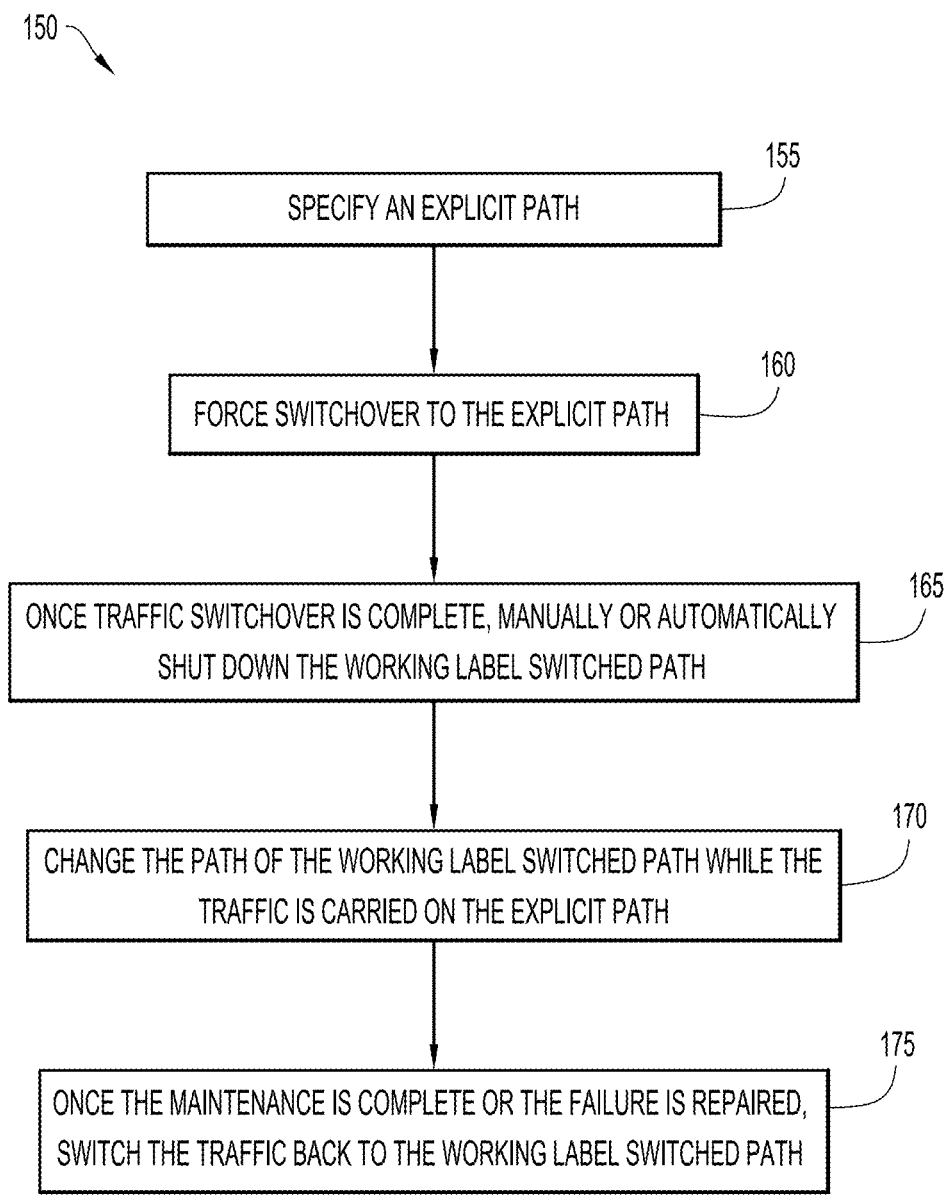
FIG. 5 is a flowchart illustrating another method in accordance with an example embodiment.

FIG. 5 is a flowchart illustrating a method 150 for using software-based bridge-and-roll in accordance with examples presented herein. At 155, an explicit path avoiding a specific link (i.e., a failed link or a link under maintenance) of a working label switched path is specified. In one example, the explicit path is a protecting label switched pre-programmed as part of a protection group. At 160, a command may be used to force switchover to the explicit path (e.g., protecting label switched path). As noted above, label switched paths are APS protected, thus switchover is hitless or performed within approximately 50 ms, thus enabling the use of software-based bridge-and-roll.

At 165, once traffic switchover is complete, the working label switched path can be manually or automatically shut down. The resources of the working label switched path may or may not be released, depending on the configuration. The GMPLS protocol will not enable reversion to a working label switched path if the working label switched path is shutdown. At 170, the path of the working label switched path can be changed while the traffic is carried on the explicit path. At 175, once the maintenance is complete or the failure is repaired, the traffic can be switched back to the working label switched path. As noted above, label switched paths are APS protected, thus reversion is hitless or performed within approximately 50 ms, thus enabling the use of software-based bridge-and-roll.

Figure 6:
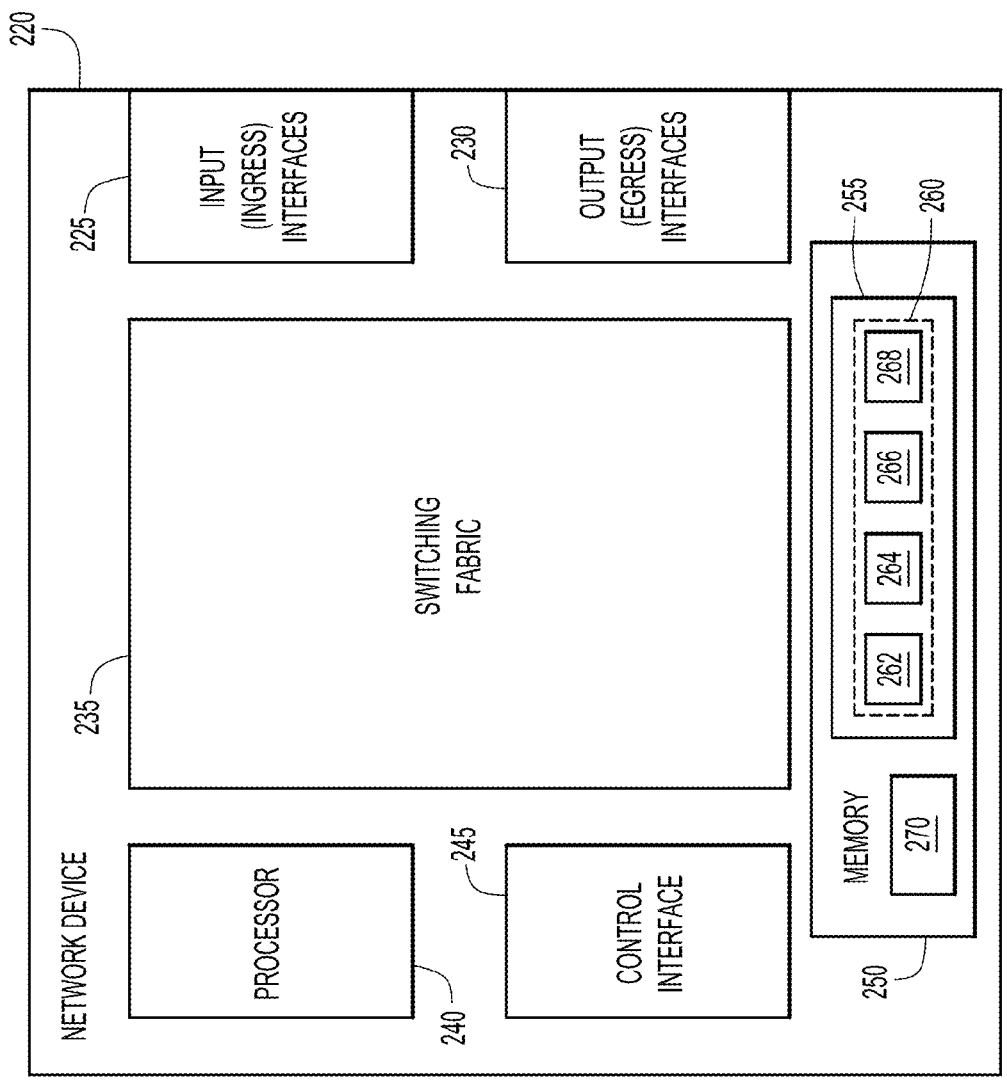
FIG. 6 is a block diagram of an optical network element configured with a fast switchover protection group in accordance with an example embodiment.

FIG. 6 is a block diagram illustrating an example of a network device 120 configured to perform fast switchover protection techniques in accordance with examples presented herein. The network device 220 of FIG. 6 illustrates a general arrangement that may correspond to an ingress network device, such as ingress network device 25 of FIGS. 1 and 2, or an egress network device, such as egress network device 30 of FIGS. 1 and 2. In the specific arrangement of FIG. 6, the network device 220 is an optical cross-connect device.

As shown, the network device 220 comprises a plurality of input (ingress) interfaces 225, a plurality of output (egress) interfaces 230, a switching fabric 235, a processor 240, a control interface 245, and a memory 250. The memory 250 comprises a fast switchover protection group state machine 255. In the specific example of FIG. 6, fast switchover protection group state machine 255 is a fast switchover APS state machine. It is to be appreciated that in other examples the fast switchover protection group state machine 255 may be, for example, a fast switchover PSC protection group state machine, a fast switchover SNC protection group state machine, a fast switchover SONET protection group state machine, a fast switchover SDH protection group state machine, a fast switchover UPSR protection group state machine, etc. The memory 270 also comprises bridge-and-roll software 270.

In operation, traffic is received at one of the input interfaces 225 and switched to an appropriate output interface 230 via the switching fabric 235 in accordance with, for example, the GMPLS protocol. As noted, in the example of FIG. 6 the network device 220 is an optical cross-connect device. As such, the input interfaces 225 and the output interfaces 230 are optical interfaces. Similarly, the switching fabric 235 is an optical switching fabric.

As noted elsewhere herein, the fast protection switchover techniques presented herein are not limited to OTN transport networks. As such, in alternative examples the network device may be, for example, a PTN device. As such, the input interfaces 225, the output interfaces 230, and the switching fabric 235 may take different forms depending on the underlying transport technology.

As shown in FIG. 6, the fast switchover APS state machine 255 is modified in accordance with the fast protection switchover techniques presented herein to include four traffic sources. That is, the fast switchover APS state machine 255 includes an APS protection group 260 defined to include a working label switched path 262, a protecting label switched path 264, a first restoration label switched path 266 (associated with the working label switched path), and a second restoration label switched path 268 (associated with the protecting label switched path). The APS protection group 260 and the label switched paths 262, 264, 266, and 268 may be defined (programmed) via the control interface 245. The control interface 245 may comprise, for example, a command-line-interface (CLI), etc.

Memory 250 may comprise read only memory (ROM), random access memory (RAM), magnetic disk storage media devices, optical storage media devices, flash memory devices, electrical, optical, or other physical/tangible memory storage devices. The processor 240 is, for example, a microprocessor or microcontroller that executes instructions for the fast switchover APS state machine 255. Thus, in general, the memory 250 may comprise one or more tangible (non-transitory) computer readable storage media (e.g., a memory device) encoded with software comprising computer executable instructions and when the software is executed (by the processor 240) it is operable to perform operations described herein. For example, the bridge-and-roll software 270 may be executed by the processor 240 to perform the software-based bridge-and-roll operations described elsewhere herein.

FIG. 6 illustrates an example in which the fast switchover protection group is created (defined) at an in-line network device (e.g., an ingress or egress network device). In this example, the label switched paths (e.g., the working label switched path, protecting label switched path, and the one or more restoration label switched paths) are added to the fast switchover protection group via the control interface 245 of the in network device 220. In alternative examples, the fast switchover protection group is defined at a network controller that is separate from the ingress and egress network devices of a transport network. In such examples, the label switched paths (e.g., the working label switched path, protecting label switched path, and the one or more restoration label switched paths) are added to the fast switchover protection at the network controller and the fast switchover protection group is sent from the network controller to the ingress and egress network devices.

Presented herein are fast switchover protection techniques that set up a restoration service for a protected service (1:1+R or 1+1+R) such that switchover to the restoration service and reversion to the nominal path can be performed with no traffic loss or with less than approximately 50 ms traffic loss (without hardware based bridge and roll). Additionally, the fast switchover protection techniques set up a restoration service for an unprotected service (1+R) such that reversion from restoration path to the nominal (working) path can be performed with no traffic loss or with less than approximately 50 ms traffic loss (without hardware based bridge and roll). The techniques also enable the use of software-based bridge-and-roll service when hardware does not have the bridge-and-roll functionality (i.e., sufficient buffering).

In summary, a method is provided comprising: adding a working label switched path to a fast switchover protection group that is configured to carry traffic from an ingress network device to an egress network device through a transport network; adding a restoration label switched path to the fast switchover protection group, wherein the restoration label switched path is associated with the working label switched path; storing the fast switchover protection group that includes the working label switched path and the restoration label switched path at the ingress network device; and after storing the fast switchover protection group at the ingress network device, using at least the working label switched path to carry traffic through the transport network.

Similarly, an apparatus is provided comprising: one or more network interfaces configured for communication on a transport network; a memory; and a processor connected to the memory, and configured to: add a working label switched path to a fast switchover protection group that is configured to carry traffic from an ingress network device to an egress network device through the transport network; add a restoration label switched path to the fast switchover protection group, wherein the restoration label switched path is associated with the working label switched path; store in the memory the fast switchover protection group that includes the working label switched path and the restoration label switched path; and after storing the fast switchover protection group at the ingress network device, enable the working label switched path for carrying traffic through the transport network.

Further still, one or more computer readable storage media is provided encoded with software comprising computer executable instructions and when the software is executed operable to: define a fast switchover protection group at an ingress network device, wherein the fast switchover protection group includes a working label switched path configured to carry traffic from the ingress network device to an egress network device over a transport network and a restoration label switched path that is associated with the working label switched path; and after defining the fast switchover protection group at the ingress network device, send traffic on at least the working label switched path.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A computer-implemented method comprising:
adding, using a processor, a working label switched path to a fast switchover protection group that is configured to carry traffic from an ingress network device to an egress network device through a transport network;
adding, using the processor, a protecting label switched path to the fast switchover protection group, wherein the protecting label switched path is associated with the working label switched path to be a backup path for the working label switched path;
adding, using the processor, a first restoration label switched path to the fast switchover protection group, wherein the first restoration label switched path is associated with the working label switched path to provide failure support for the working label switched path;
adding, using the processor, a second restoration label switched path to the fast switchover protection group, wherein the second restoration label switched path is associated with the protecting label switched path to provide failure support for the protecting label switched path;
storing, using the processor, the fast switchover protection group that includes the working label switched path, the protecting label switched path, the first restoration label switched path and the second restoration label switched path at the ingress network device; and
after storing the fast switchover protection group at the ingress network device, using at least the working label switched path to carry traffic through the transport network.

2. The method of claim 1, further comprising:
sending the fast switchover protection group that includes the working label switched path, the protecting label switched path, the first restoration label switched path and the second restoration label switched path to the egress network device.

3. The method of claim 1, further comprising:
enabling both the working label switched path and the protecting label switched path to carry traffic through the transport network.

4. The method of claim 1, further comprising:
adding the working label switched path, the protecting label switched path, the first restoration label switched path and the second restoration label switched path to the fast switchover protection group via a control interface of the ingress network device.

5. The method of claim 1, further comprising:
detecting a failure at the working label switched path; and
in response to detecting the failure, performing switchover from the working label switched path to the first restoration label switched path.

6. The method of claim 5, further comprising:
performing hitless switchover from the working label switched path to the first restoration label switched path.

7. The method of claim 5, further comprising:
performing switchover from the working label switched path to the first restoration label switched path in less than approximately 50 milliseconds.

8. The method of claim 5, further comprising:
executing software-based bridge-and-roll operations to perform the switchover from the working label switched path to the first restoration label switched path.

9. An apparatus comprising:
one or more network interfaces configured for communication on a transport network;
a memory; and
a processor connected to the memory, and configured to:
add a working label switched path to a fast switchover protection group that is configured to carry traffic from an ingress network device to an egress network device through the transport network;
add a protecting label switched path to the fast switchover protection group, wherein the protecting label switched path is associated with the working label switched path to be a backup path for the working label switched path;
add a first restoration label switched path to the fast switchover protection group, wherein the first restoration label switched path is associated with the working label switched path to provide failure support for the working label switched path;
add a second restoration label switched path to the fast switchover protection group, wherein the second restoration label switched path is associated with the protecting label switched path to provide failure support for the protecting label switched path;
store in the memory the fast switchover protection group that includes the working label switched path, the protecting label switched path, the first restoration label switched path and the second restoration label switched path; and
after storing the fast switchover protection group at the ingress network device, enable the working label switched path for carrying traffic through the transport network.

10. The apparatus of claim 9, wherein the processor is configured to send the fast switchover protection group that includes the working label switched path, the protecting label switched path, the first restoration label switched path and the second restoration label switched path to the egress network device.

11. The apparatus of claim 9, wherein the processor is configured to:
detect a failure at the working label switched path; and
in response to detection of the failure, perform switchover from the working label switched path to the first restoration label switched path.

12. The apparatus of claim 11, wherein the processor is configured to:
execute software-based bridge-and-roll operations to perform the switchover from the working label switched path to the first restoration label switched path.

13. The apparatus of claim 11, wherein the processor is further configured to perform hitless switchover from the working label switched path to the first restoration label switched path.

14. The apparatus of claim 9, wherein the processor is configured to add the working label switched path, the protecting label switched path, the first restoration label switched path and the second restoration label switched path to the fast switchover protection group via a control interface of the ingress network device.

15. One or more non-transitory computer readable storage media encoded with software comprising computer executable instructions and when the software is executed operable to:
define a fast switchover protection group at an ingress network device, wherein the fast switchover protection group includes a working label switched path configured to carry traffic from the ingress network device to an egress network device over a transport network, a protecting label switched path associated with the working label switched path to be a backup path for the working label switched path, a first restoration label switched path that is associated with the working label switched path to provide failure support for the working label switched path and a second restoration label switched path associated with the protecting label switched path to provide failure support for the protecting label switched path; and after defining the fast switchover protection group at the ingress network device, send traffic on at least the working label switched path.

16. The non-transitory computer readable storage media of claim 15, further comprising instructions operable to:
   detect that a failure has occurred along the working label switched path; and
   in response to detection of the failure, perform switchover from the working label switched path to the first restoration label switched path.

17. The non-transitory computer readable storage media of claim 16, further comprising instructions operable to perform hitless switchover from the working label switched path to the first restoration label switched path.

18. The non-transitory computer readable storage media of claim 16, further comprising instructions operable to execute software-based bridge-and-roll operations to perform the switchover from the working label switched path to the first restoration label switched path.

19. The non-transitory computer readable storage media of claim 15, further comprising instructions operable to send the fast switchover protection group that includes the working label switched path, the protecting label switched path, the first restoration label switched path and the second restoration label switched path to the egress network device.

20. The non-transitory computer readable storage media of claim 15, further comprising instructions operable to add the working label switched path, the protecting label switched path, the first restoration label switched path and the second restoration label switched path to the fast switchover protection group via a control interface of the ingress network device.

* * * * *